(12) United States Patent
Liu

(10) Patent No.: US 10,884,695 B2
(45) Date of Patent: Jan. 5, 2021

(54) DISPLAY SYSTEM

(71) Applicant: FANUC CORPORATION, Yamanashi (JP)

(72) Inventor: Kun Liu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/254,980

(22) Filed: Jan. 23, 2019

(65) Prior Publication Data

US 2019/0265936 A1 Aug. 29, 2019

(30) Foreign Application Priority Data

Feb. 28, 2018 (JP) ................................. 2018-034595

(51) Int. Cl.
*G06F 3/147* (2006.01)
*G05B 19/418* (2006.01)

(52) U.S. Cl.
CPC ....... *G06F 3/147* (2013.01); *G05B 19/41835* (2013.01); *G05B 2219/33099* (2013.01)

(58) Field of Classification Search
CPC ................ G05B 19/406; G05B 19/409; G05B 19/4183; G05B 19/41835; G05B 2219/33099; G05B 2219/36163; G05B 2219/39488; G06F 3/147
See application file for complete search history.

(56) References Cited

U.S. PATENT DOCUMENTS

| | | | | |
|---|---|---|---|---|
| 5,027,154 | A  * | 6/1991 | Ujiie | G03B 27/462 355/77 |
| 2001/0004241 | A1 * | 6/2001 | Fukano | B41J 3/44 340/692 |
| 2013/0021641 | A1 * | 1/2013 | Park | H04N 1/00204 358/1.14 |
| 2014/0292498 | A1 * | 10/2014 | Hosoya | G06Q 10/00 340/10.51 |
| 2016/0179088 | A1 * | 6/2016 | Matsukura | G06F 11/3636 700/174 |
| 2019/0377323 | A1 * | 12/2019 | Kamiguchi | G05B 19/409 |

FOREIGN PATENT DOCUMENTS

| | | |
|---|---|---|
| JP | 2008-78903 | 4/2008 |
| JP | 5924518 | 4/2016 |

* cited by examiner

*Primary Examiner* — Mihir K Rayan
(74) *Attorney, Agent, or Firm* — Wenderoth, Lind & Ponack, L.L.P.

(57) ABSTRACT

A display system capable of displaying appropriate information on a controller that performs control on an industrial machine including at least a machine tool or a robot on an external terminal is provided. A numerical controller of a display system includes a display data transmitting unit that transmits display data including a screen data ID of all pieces of data displayed on a touch panel to an external terminal. The external terminal includes: a description information storage unit that stores the screen data ID and description information in correlation; and a description information output unit that acquires, from the description information storage unit, description information based on the screen data ID included in the display data received from the numerical controller and outputs the description information to a touch panel.

6 Claims, 16 Drawing Sheets

100

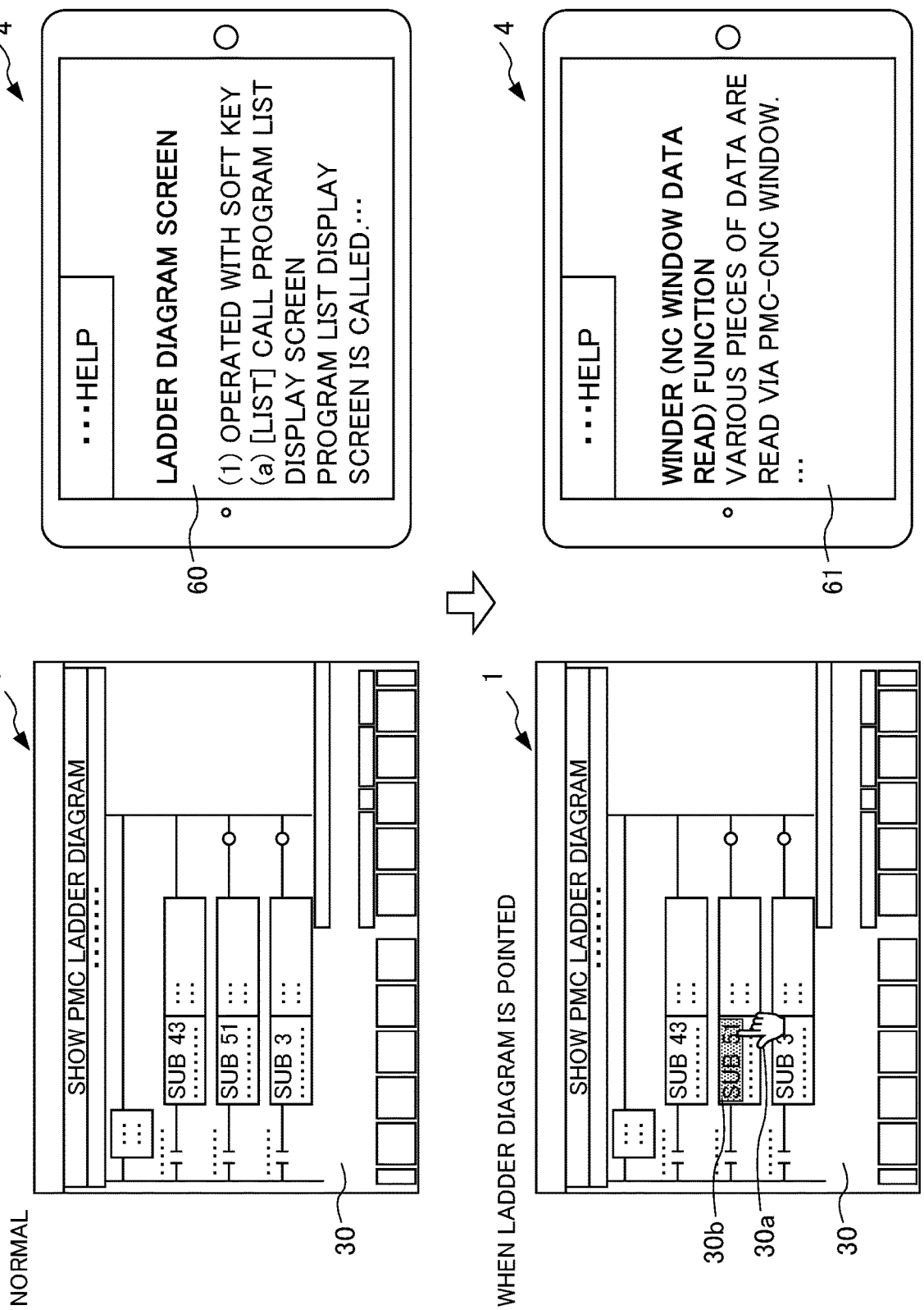

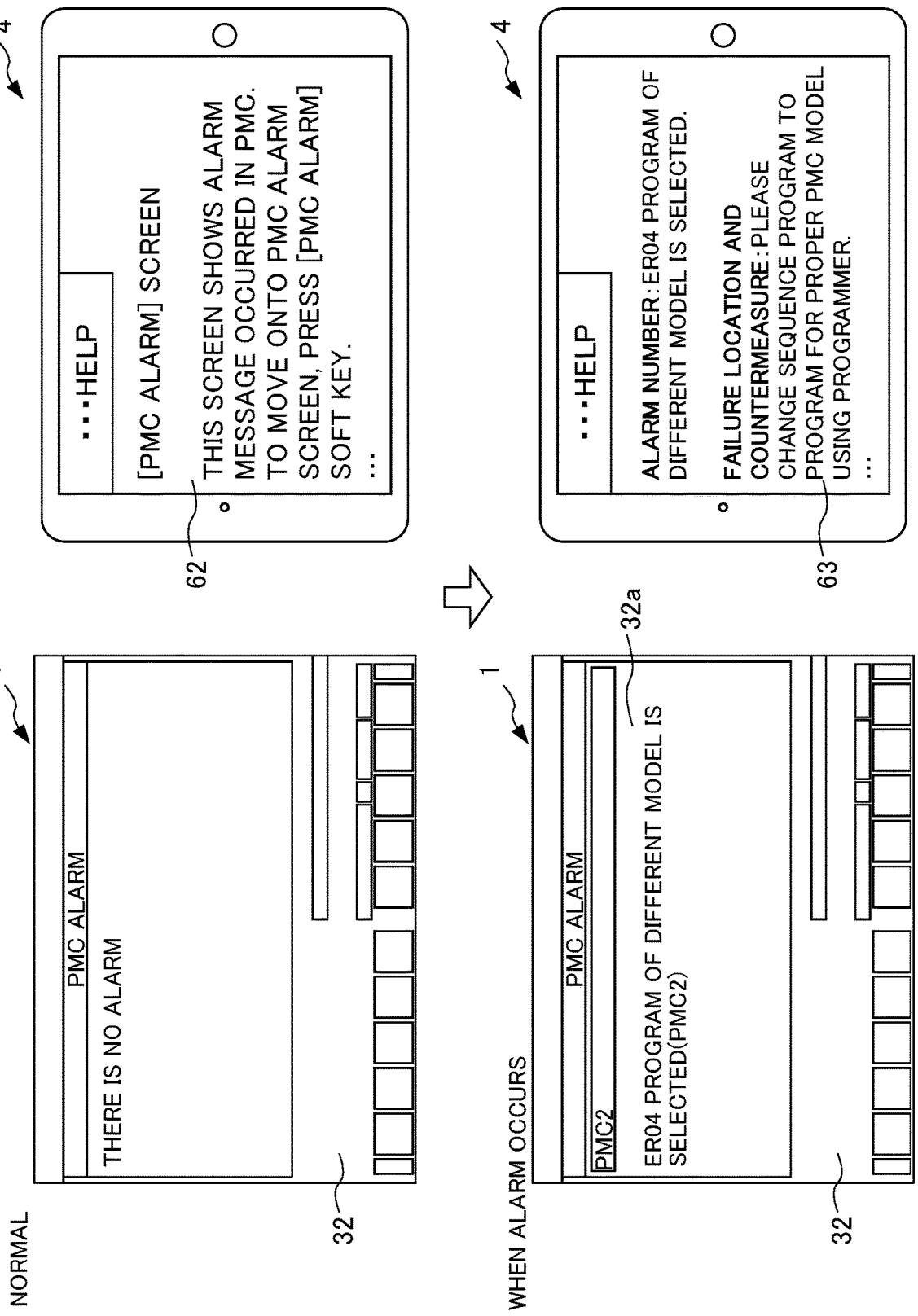

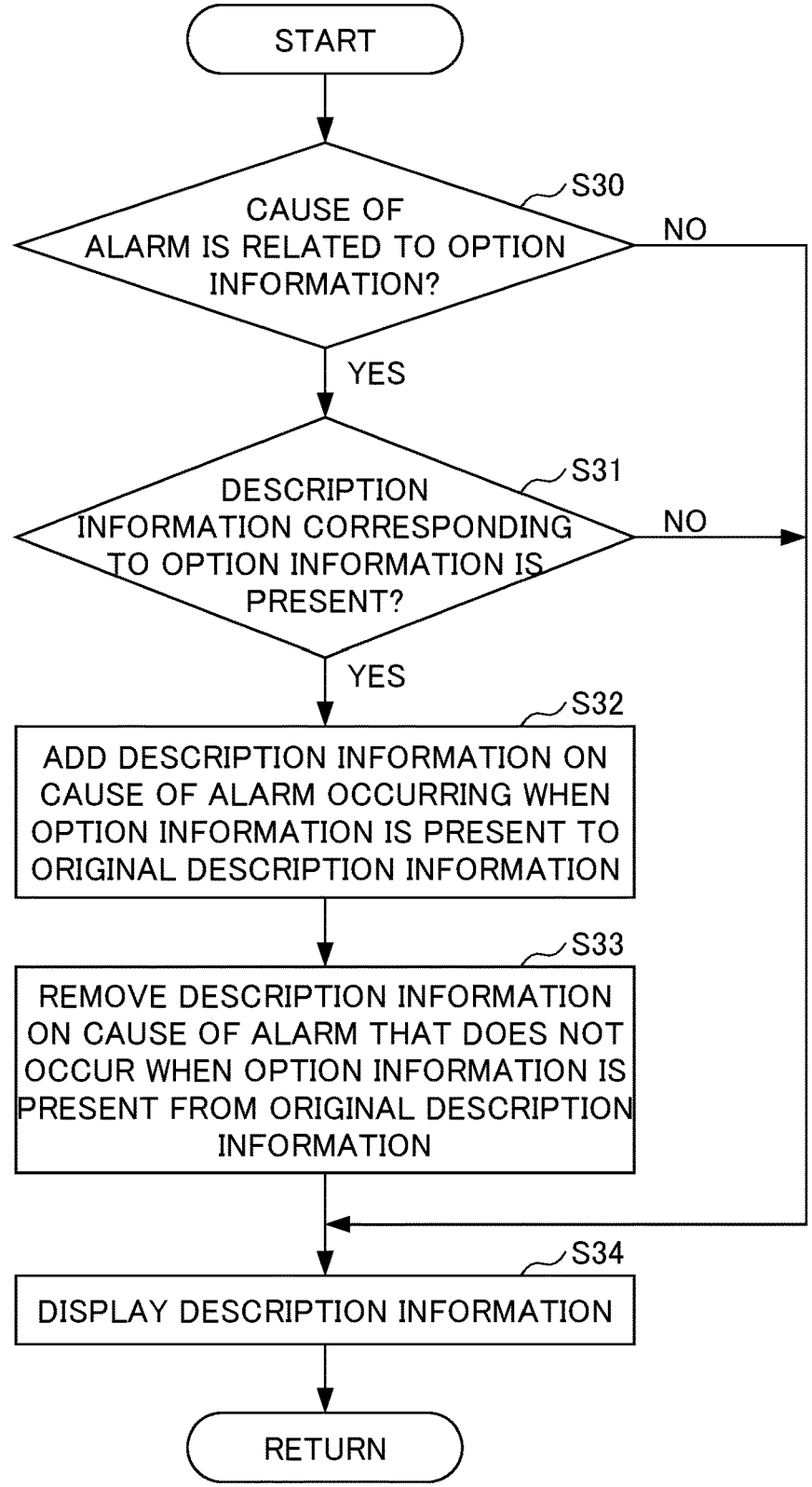

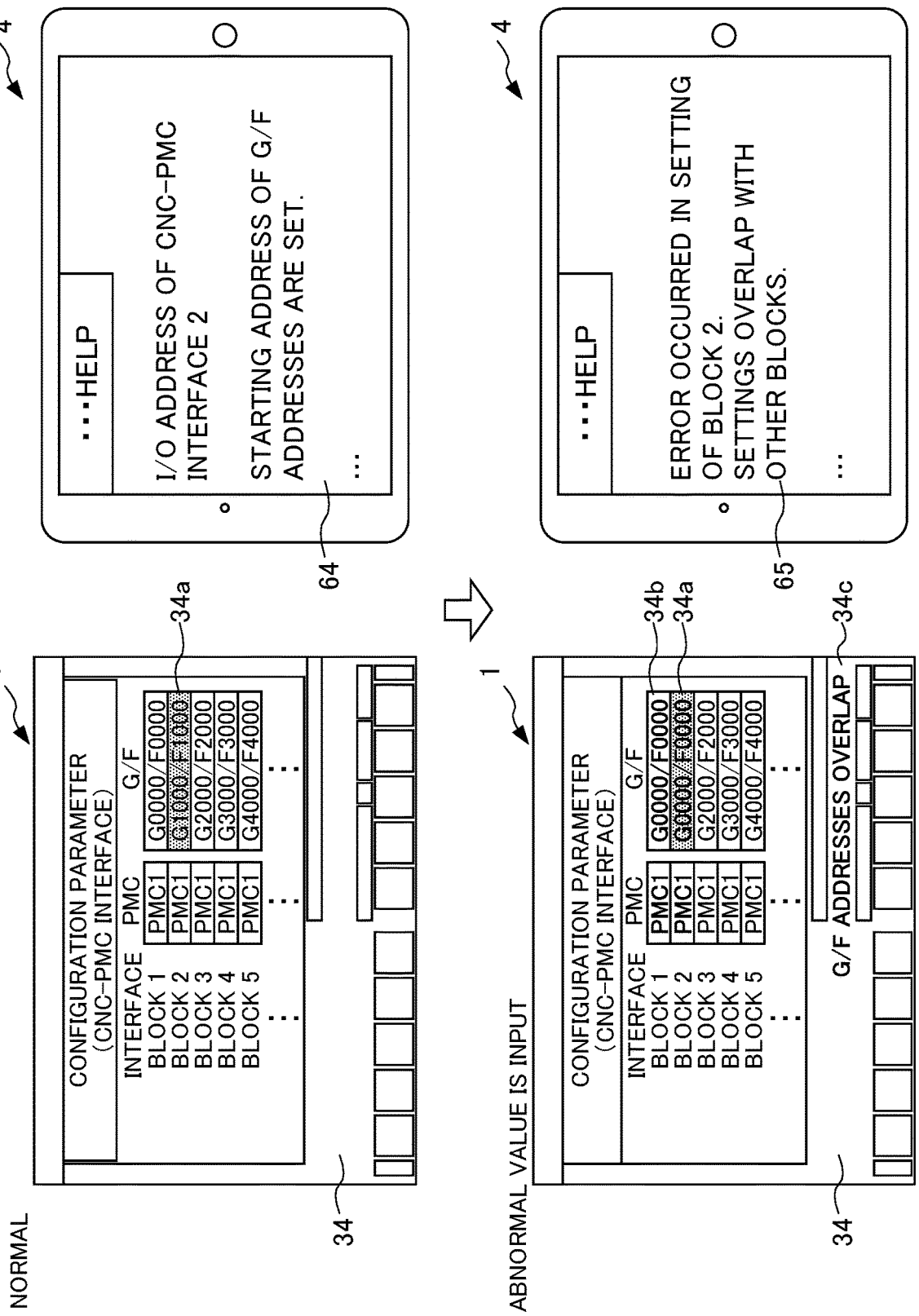

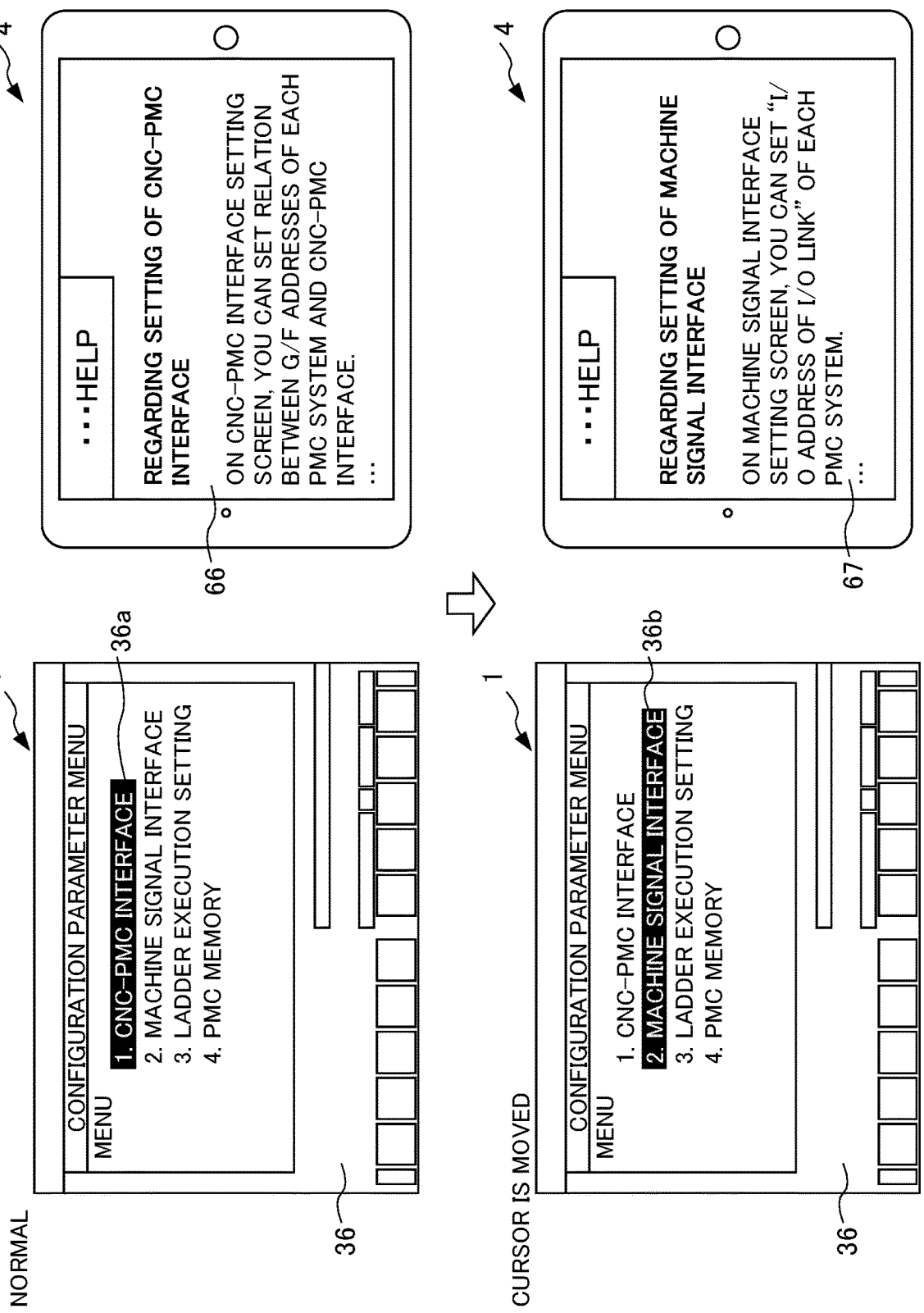

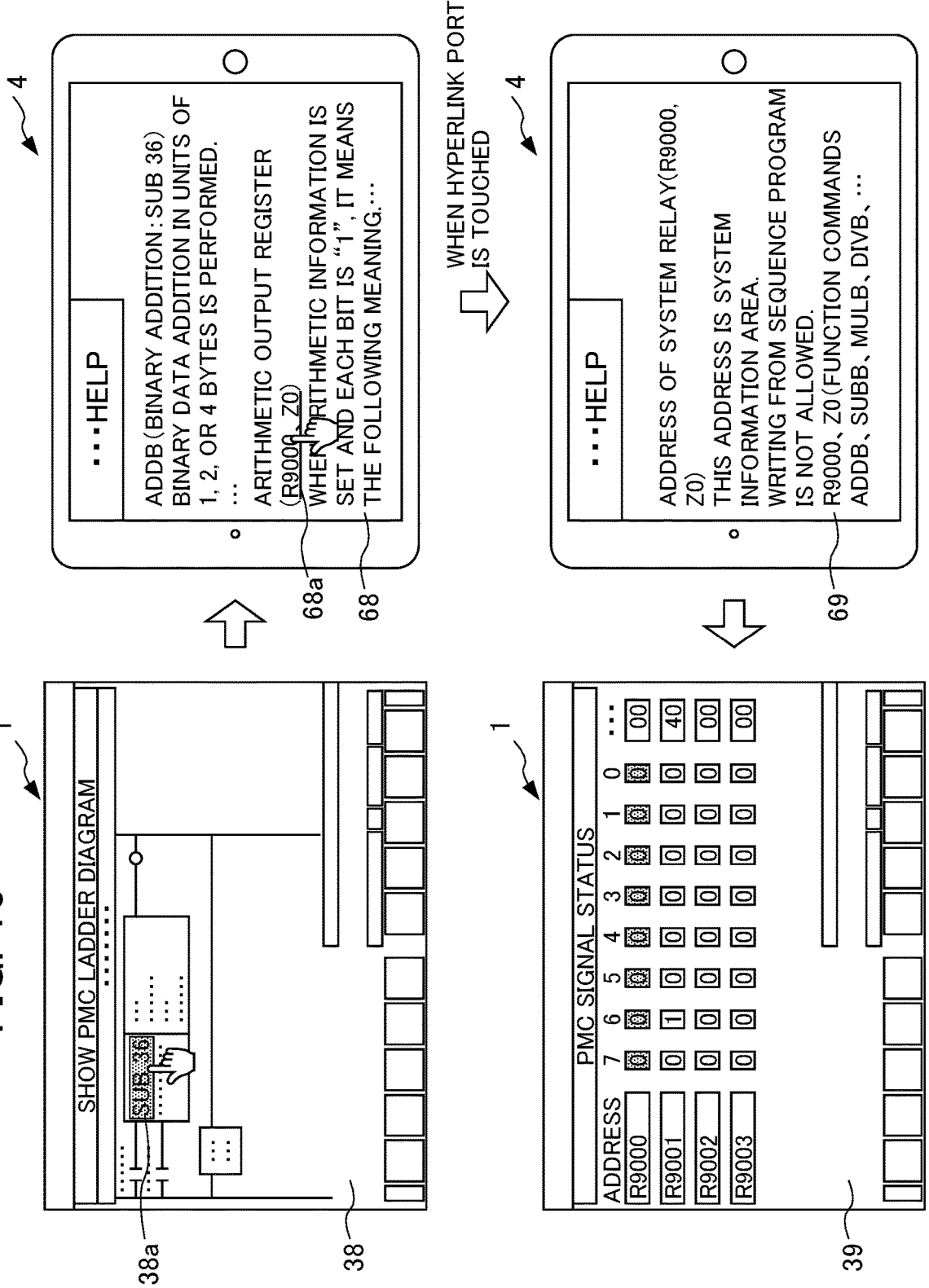

DISPLAY SYSTEM

This application is based on and claims the benefit of priority from Japanese Patent Application No. 2018-034595, filed on 28 Feb. 2018, the content of which is incorporated herein by reference.

BACKGROUND OF THE INVENTION

Field of the Invention

The present invention relates to a display system which uses an external terminal.

Related Art

Conventionally, a display device such as a liquid crystal panel having a touch (position input) function, for example, is provided in a numerical controller (NC) that controls a machine tool, for example. Various pieces of information are displayed on the display device according to a touch operation of an operator. A numerical controller includes a computerized numerical controller (CNC) and the like, and in the present specification, a numerical controller will be described as including a computerized numerical controller and the like. An example of a touch operation of an operator includes an operation of displaying a help window on a display device to display help related to a function being operated. However, display devices of numerical controllers have different features such as the size of a display portion and the availability of a touch operation depending on a model, a manufacturing date, or the like. Since there is a limit on the amount of information that can be displayed on a small display screen, when the help window as mentioned above is displayed, an original screen hides behind the help window. Therefore, it is difficult for an operator to perform an operation while referring to the help such that it is not possible to perform an operation on the original screen since the help window is displayed.

Here, Patent Documents 1 and 2 which relate to a multifunction device, for example, disclose a technology in which a mobile terminal cooperates with a main body operation panel wirelessly so that help related to a function selected by a user on a screen displayed on the main body operation panel is displayed on a mobile terminal.

Patent Document 1: Japanese Patent No. 5924518
Patent Document 2: Japanese Unexamined Patent Application, Publication No. 2008-078903

SUMMARY OF THE INVENTION

According to the technology disclosed in Patent Documents 1 and 2, information on the function selected by an operator on the main body side is displayed on an external terminal. On the other hand, a controller that performs control on an industrial machine including at least a machine tool or a robot needs to display various pieces of information. Due to this, the controller cannot determine a content to be displayed uniquely. Therefore, when the technology disclosed in Patent Documents 1 and 2 is applied to a controller, since only determined information can be displayed, it is not possible to display another information which is not determined but needs to be displayed. Thus, the technology disclosed in Patent Documents 1 and 2 lacks flexibility.

An object of the present invention is to provide a display system capable of displaying appropriate information on a controller that performs control on an industrial machine including at least a machine tool or a robot on an external terminal.

(1) A display system (for example, a display system 100 to be described later) of the present invention includes: a controller (for example, a numerical controller 1 to be described later) that has a display device (for example, a touch panel 18 to be described later) and performs control on an industrial machine including at least a machine tool or a robot; and an external terminal (for example, an external terminal 4 to be described later), wherein the controller includes a display data transmitting unit (for example, a display data transmitting unit 12 to be described later) that transmits display data including data identification information of all pieces of data displayed on the display device to the external terminal, and the external terminal includes: a description information storage unit (for example, a description information storage unit 46 to be described later) that stores the data identification information and description information corresponding to the data identification information in correlation; and a description information output unit (for example, a description information output unit 41 to be described later) that acquires, from the description information storage unit, the description information based on the data identification information included in the display data received from the controller and outputs the description information to a display unit (for example, a touch panel 48 to be described later).

(2) In the display system according to (1), the description information storage unit of the external terminal may further store a priority level of the description information in correlation with the description information, and the description information output unit of the external terminal may acquire, from the description information storage unit, the description information having the highest priority level among pieces of description information based on the data identification information included in the display data received from the controller and output the description information to the display unit.

(3) In the display system according to (2), the description information output unit of the external terminal may acquire, from the description information storage unit, the pieces of description information based on the data identification information included in the display data received from the controller in descending order of priority levels and output the description information to the display unit.

(4) In the display system according to any one of (1) to (3), the data identification information may include identification information of a screen displayed on the display device, identification information of each piece of data that forms the screen, identification information of data selected by an operation, and identification information of data indicating an abnormality in an input value.

(5) In the display system according to any one of (1) to (4), the controller may include a device data transmitting unit (for example, a device data transmitting unit 11 to be described later) that transmits, to the external terminal, device data indicating a type of the controller including model information of the controller and option information and parameters related to additional elements, the description information storage unit of the external terminal may further store the device data in correlation with the description information, and the description information output unit of the external terminal may perform editing to add or remove the acquired description information on the basis of the device data by referring to the description information storage unit and output the edited description information to the display unit.

(6) In the display system according to any one of (1) to (5), the description information may include transition destination information of transitioning the description information to another description information, the external terminal may include: a transition destination information output unit (for example, a transition destination information output unit 42 to be described later) that outputs the other description information corresponding to the transition destination information to the display unit upon receiving an operation of selecting the transition destination information of the description information output to the display unit; and a transition data transmitting unit (for example, a transition data transmitting unit 43 to be described later) that transmits transition data including description identification information for identifying the other description information to the controller, and the controller may include: a description corresponding screen storage unit (for example, a description corresponding screen storage unit 17 to be described later) that stores the description identification information and a screen corresponding to a description content of the description identification information; and a screen switching output unit (for example, a screen switching output unit 13 to be described later) that acquires a screen corresponding to the description identification information of the received transition data from the description corresponding screen storage unit and outputs the screen to the display device.

According to the present invention, it is possible to provide a display system capable of displaying appropriate information on a controller that performs control on an industrial machine including at least a machine tool or a robot on an external terminal.

BRIEF DESCRIPTION OF THE DRAWINGS

FIG. 8 is a diagram illustrating specific example 1 of the display on the external terminal corresponding to the display on the numerical controller according to the present embodiment.

FIG. 9 is a diagram illustrating specific example 2 of the display on the external terminal corresponding to the display on the numerical controller according to the present embodiment.

FIG. 10 is a flowchart illustrating an option process of the external terminal according to the present embodiment.

FIG. 13 is a diagram illustrating specific example 3 of the display on the external terminal corresponding to the display on the numerical controller according to the present embodiment.

FIG. 14 is a diagram illustrating specific example 4 of the display on the external terminal corresponding to the display on the numerical controller according to the present embodiment.

FIG. 15 is a diagram illustrating specific example 5 of the display on the numerical controller corresponding to the display on the external terminal according to the present embodiment.

DETAILED DESCRIPTION OF THE INVENTION

Embodiment

First, an overview of an embodiment of the present invention will be described. The present embodiment relates to a system that displays related information of data displayed on a display screen of a numerical controller which is an example of a controller that performs control on an industrial machine including at least a machine tool or a robot on an external terminal communicably connected by pairing with the numerical controller.

Figure 1:
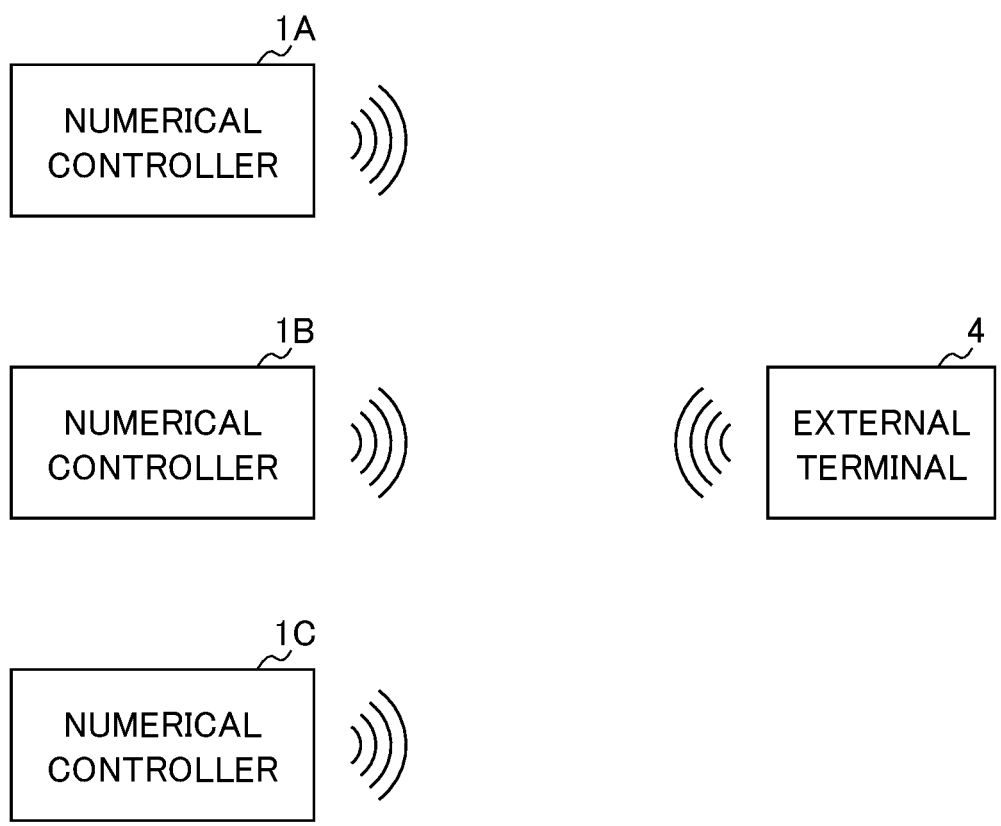
FIG. 1 is a schematic diagram illustrating a basic configuration of a display system according to the present embodiment.
Figure 2:
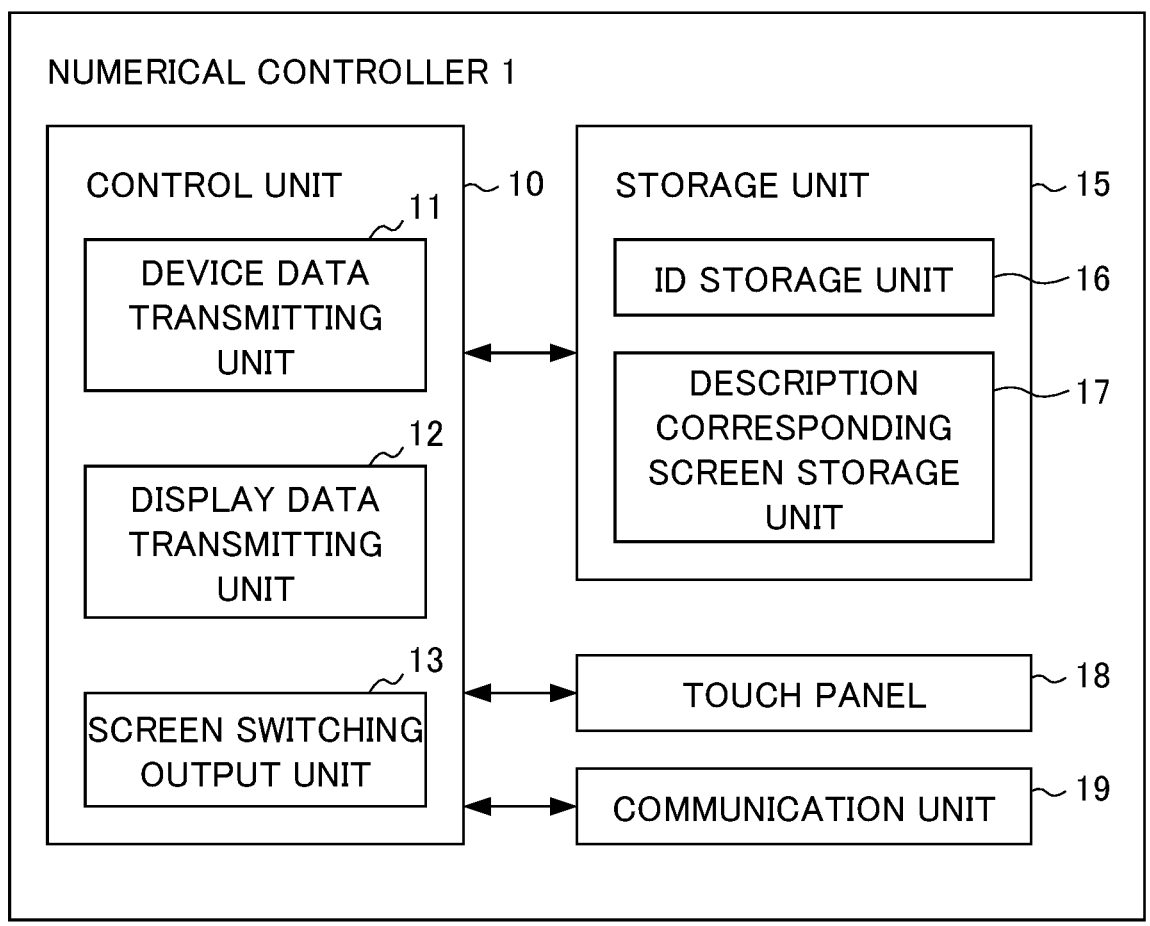
FIG. 2 is a block diagram of a numerical controller according to the present embodiment.
Figure 3:
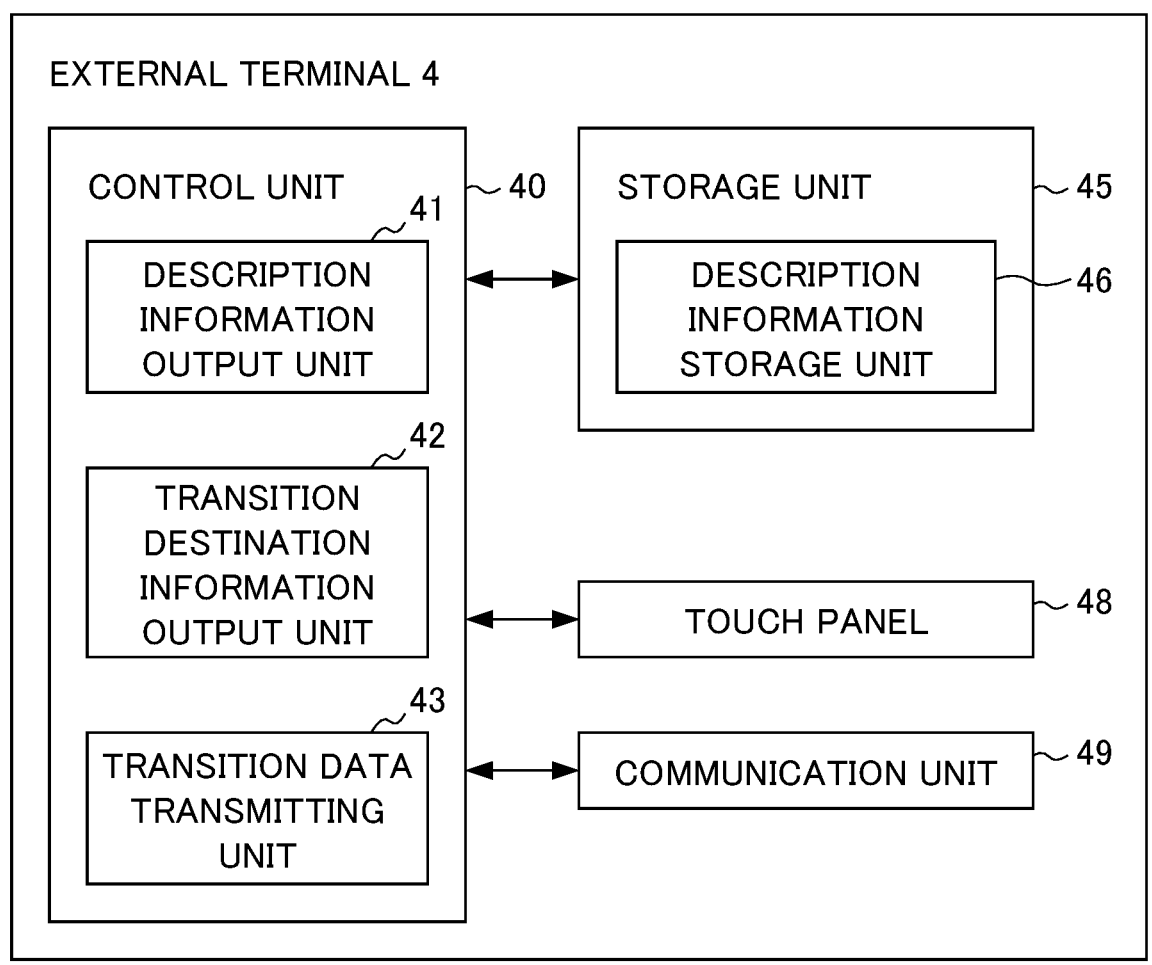
FIG. 3 is a block diagram of an external terminal according to the present embodiment.

Next, a configuration of a display system 100 which is the present embodiment and respective devices will be described with reference to FIGS. 1 to 3. As illustrated in FIG. 1, the display system 100 includes one or more numerical controllers 1 and an external terminal 4. Although three numerical controllers 1A, 1B, and 1C are provided in FIG. 1, an arbitrary number of numerical controllers may be provided as long as there is at least one numerical controller. When the numerical controllers 1A, 1B, and 1C are not distinguished from each other, the numerical controllers will be described as the numerical controller 1. The display system 100 communicably connects one numerical controller 1 to the external terminal 4 by pairing, for example, and the external terminal 4 displays a help screen or the like of the paired numerical controller 1.

[Numerical Controller 1]

The numerical controller 1 is a device for causing a machine tool, an industrial machine, or the like to perform a predetermined operation by controlling a peripheral device (not illustrated) connected to the machine tool, the industrial machine, or the like connected to the numerical controller 1. As illustrated in FIG. 2, the numerical controller 1 includes a control unit 10, a storage unit 15, a touch panel 18, and a communication unit 19.

The control unit 10 is a central processing unit (CPU) and controls the numerical controller 1 in an integrated manner by executing various programs for controlling the numerical controller 1 stored in the storage unit 15. The control unit 10 includes a device data transmitting unit 11, a display data transmitting unit 12, and a screen switching output unit 13. These functional units are realized when the control unit 10 executes programs stored in the storage unit 15. The numerical controller 1 also includes functional units unique to the numerical controller other than these functional units, and these functional units are known to those skilled in the art and the description thereof will be omitted.

The device data transmitting unit 11 transmits device data to external devices. The device data refers to data indicating the type of the numerical controller 1 including model information of the numerical controller 1 and option information and parameters related to additional elements, for example. The device data transmitting unit 11 transmits device data to external devices via the communication unit 19 when a communication connection is established by pairing or according to an instruction from an operator operating the numerical controller 1, for example.

The display data transmitting unit 12 transmits display data to the external terminal 4 communicably connected thereto via pairing. The display data refers to data including all screen data ID (data identification information) of all pieces of data displayed on the touch panel 18. Moreover, examples of the screen data ID include a screen ID of a screen displayed on the touch panel 18, a data ID of each piece of data forming the screen, a data ID of data selected by an operation, and a data ID of data indicating abnormalities in an input value. The display data includes text data other than the screen data ID. The screen switching output unit 13 outputs a display content of a screen displayed on the touch panel 18 by switching the display content to a content of a screen corresponding to transition data received from the external terminal 4.

The storage unit 15 is a storage area in which programs and the like executed by the control unit 10 are stored. The storage unit 15 stores programs that execute various functions of the control unit 10. Moreover, the storage unit 16 stores an ID storage unit 16 and a description corresponding screen storage unit 17. The ID storage unit 16 stores screen data ID output by the numerical controller 1. The description corresponding screen storage unit 17 stores a screen corresponding to a description content in correlation with a description ID (description identification information) for identifying description information.

The touch panel 18 performs the roles of both a display device and an input device that receives a touch operation by a finger of an operator. The communication unit 19 is a communication control device that transmits radio waves for pairing according to Bluetooth (registered trademark) which is a near-field wireless communication technology used for connection between devices at a range of approximately several meters and transmits and receives data to and from the paired external terminal 4.

[External Terminal 4]

The external terminal 4 is a mobile terminal represented by a tablet terminal or a smartphone, for example. The external terminal 4 outputs related information corresponding to the display on the touch panel 18 of the numerical controller 1 connected by pairing. As illustrated in FIG. 3, the external terminal 4 includes a control unit 40, a storage unit 45, a touch panel 48, and a communication unit 49.

The control unit 40 may be a CPU and controls the external terminal 4 in an integrated manner by executing various programs for controlling the external terminal 4 stored in the storage unit 45. The control unit 40 includes a description information output unit 41, a transition destination information output unit 42, and a transition data transmitting unit 43. These respective functional units are realized when the control unit 40 executes programs stored in the storage unit 45.

The description information output unit 41 acquires description information based on a screen data ID included in the display data received from the numerical controller 1 from a description information storage unit 46 and outputs the description information to the touch panel 48. Here, the description information output unit 41 may output description information having a higher priority level among pieces of description information based on the screen data ID included in the display data received from the numerical controller 1 to the touch panel 48. Moreover, the description information output unit 41 may perform editing to add or remove the acquired description information based on the device data by referring to the description information storage unit 46 and output the edited description information to the touch panel 48.

When the description information includes transition destination information such as a hyperlink for displaying another information, the transition destination information output unit 42 outputs another description information corresponding to the transition destination information to the touch panel 48 upon receiving a select operation on the transition destination information. The transition data transmitting unit 43 transmits transition data including a description ID for identifying another description information to the numerical controller 1 in response to the output of the other description information by the transition destination information output unit 42.

The storage unit 45 is a storage area in which programs and the like executed by the control unit 40 are stored. The storage unit 45 stores programs for executing various functions of the control unit 40. Moreover, the storage unit 45 stores the description information storage unit 46. The description information storage unit 46 stores the screen data ID and a description (description information) indicating a description content in correlation. The description information storage unit 46 also stores priority level data indicating a priority level and option data which is at least a part of the device data in correlation.

The touch panel 48 plays the roles of both a display unit and an input unit that receives a touch operation by a finger of an operator. The communication unit 49 is a communication control device that transmits and receives data to and from the paired numerical controller 1.

[Connecting Process]

Figure 4:
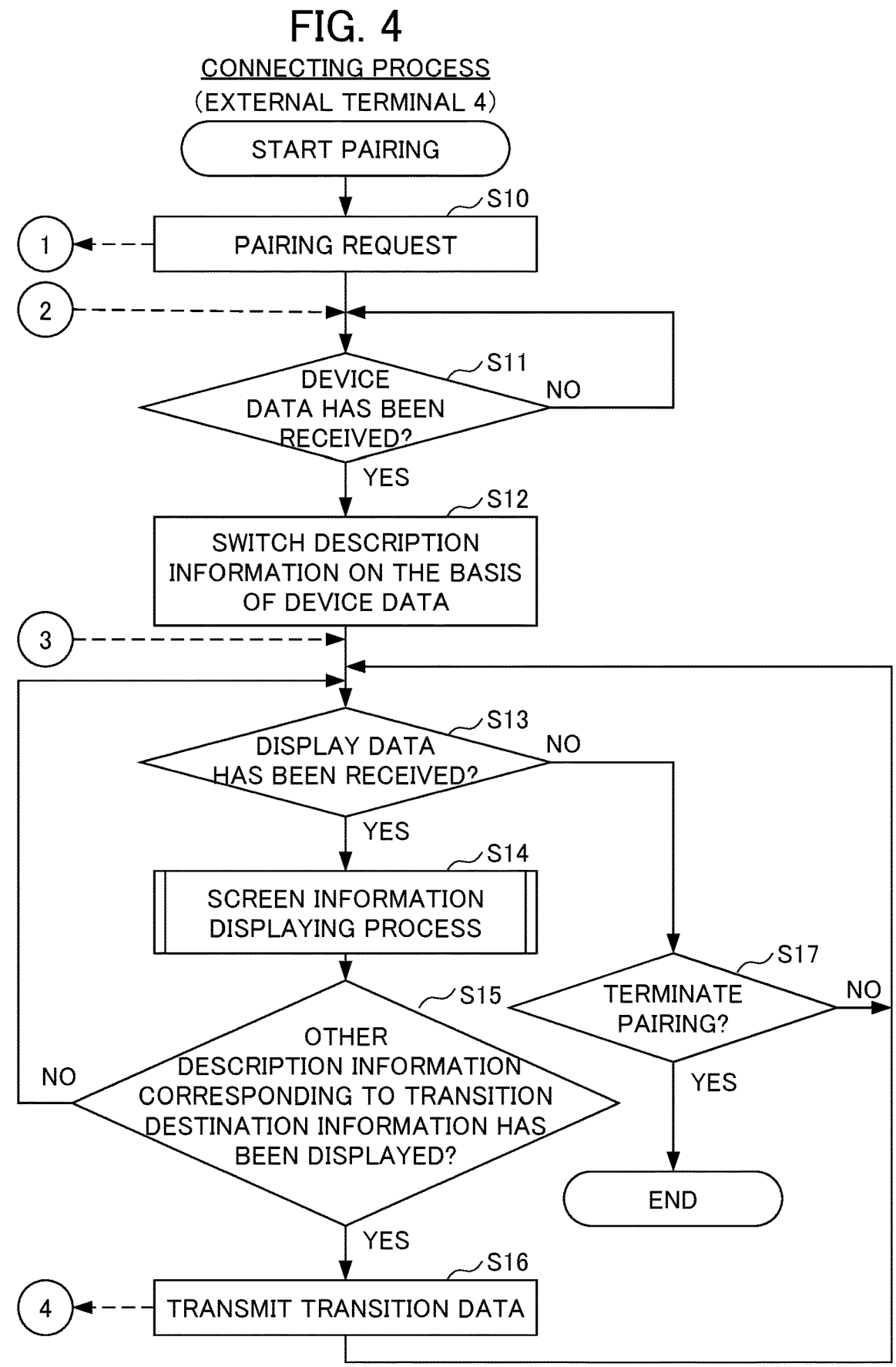
FIG. 4 is a flowchart illustrating a connecting process of the external terminal according to the present embodiment.
Figure 5:
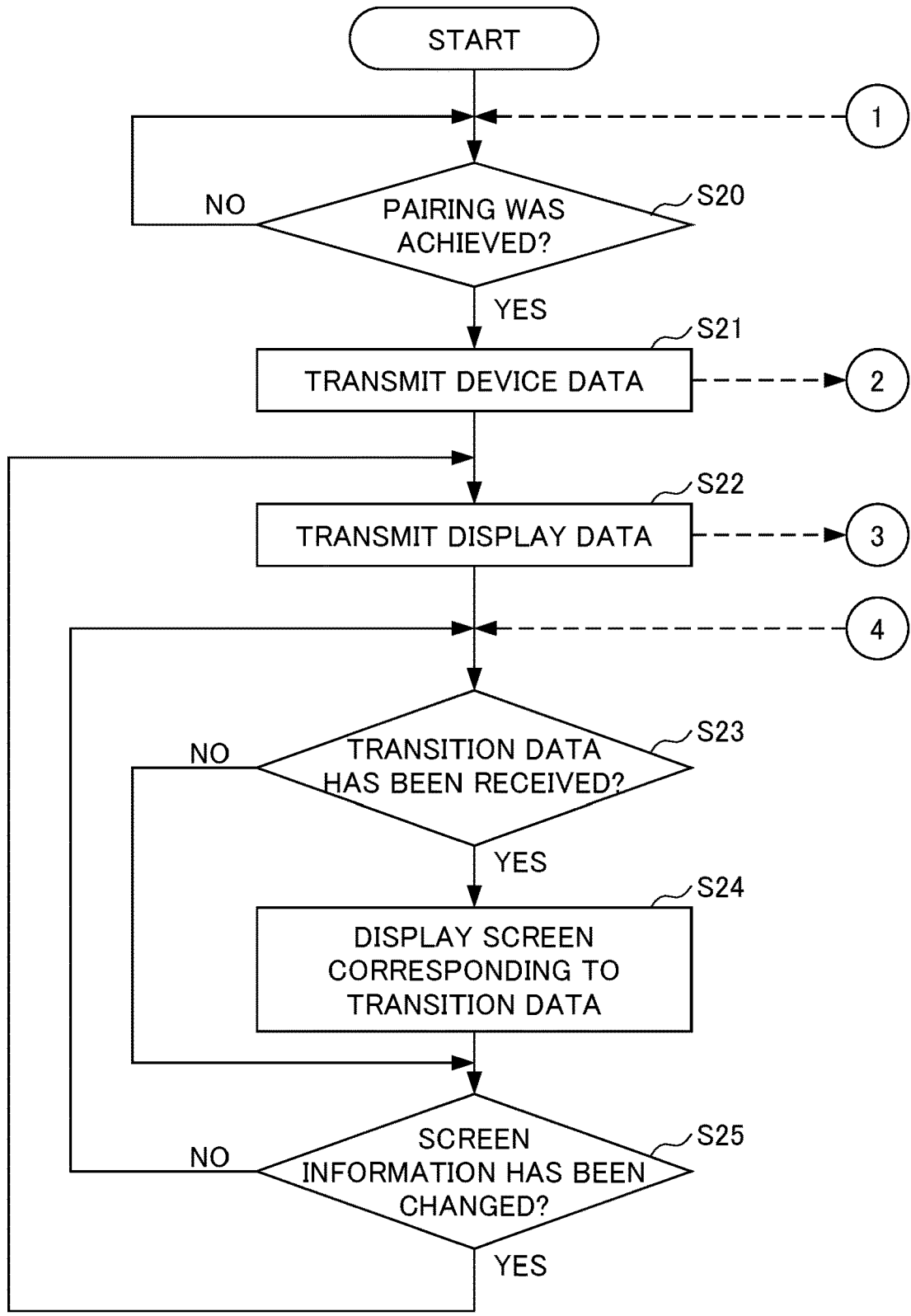
FIG. 5 is a flowchart illustrating a connecting process of the numerical controller according to the present embodiment.

Next, a process of connecting the numerical controller 1 and the external terminal 4 and displaying information will be described. FIG. 4 is a flowchart illustrating a connecting process of the external terminal 4, and FIG. 5 is a flowchart illustrating a connecting process of the numerical controller 1. In step S10 (hereinafter step Sxx will be simply referred to as Sxx) in FIG. 4, the control unit 40 of the external terminal 4 transmits a pairing request to one numerical controller 1 selected by an operator among one or more numerical controllers 1 connectable thereto.

Figure 6:
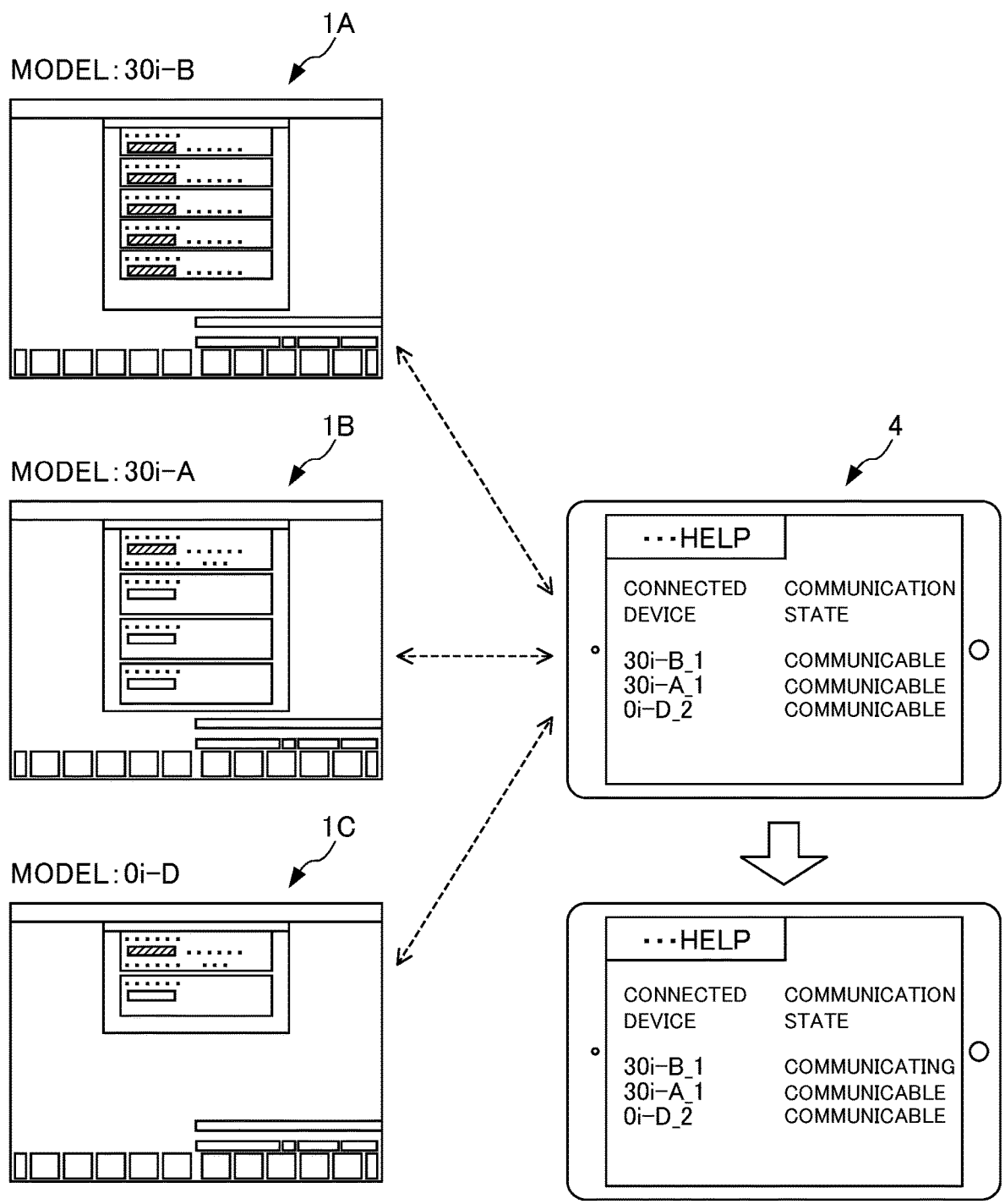
FIG. 6 is a diagram illustrating an example of a screen displayed on the external terminal when pairing is performed according to the present embodiment.

FIG. 6 illustrates an example of a screen displayed on the touch panel 48 of the external terminal 4 when performing pairing. In this example, three numerical controllers 1A to 1C are communicably connected to the external terminal 4 as pairing targets. When an operator performs a touch operation of selecting a connection target numerical controller 1, for example, on the screen of the external terminal 4, the control unit 40 transmits a pairing request to the communicable numerical controller 1. In the example illustrated in FIG. 6, the control unit 40 transmits a pairing request to the numerical controller 1A.

In FIG. 5, the control unit 10 of the numerical controller 1 receives the pairing request that the external terminal 4 has transmitted in S10 of FIG. 4. In S20, the control unit 10 determines whether pairing was achieved for the received request. When pairing was achieved (S20: YES), the control unit 10 proceeds to S21. However, when pairing was not achieved (S20: NO), the control unit 10 remains in this process until pairing is achieved. In the example of FIG. 6, the numerical controller 1A can be paired with the external terminal 4 (S20 in FIG. 5: YES), the flow proceeds to S21. On the other hand, since the numerical controllers 1B and 1C cannot be paired with the external terminal 4 (S20: NO), the flow remains in this process until pairing is achieved.

In S21, the control unit 10 (the device data transmitting unit 11) transmits device data indicating the type of the numerical controller 1 including the model information of the numerical controller 1 and the option information and the parameters related to the additional elements to the external terminal 4. In S22, the control unit 10 (the display data transmitting unit 12) transmits display data including screen data IDs of all pieces of data included in the screen displayed on the touch panel 18 to the external terminal 4. After that, the control unit 10 proceeds to S23.

In S11 of FIG. 4, the control unit 40 determines whether the numerical controller 1 has received the device data transmitted in S21 of FIG. 5. When the device data was received (S11: YES), the control unit 40 proceeds to S12. On the other hand, when the device data was not received (S11: NO), the control unit 40 remains in this process until the device data is received. In S12, the control unit 40 switches the description information on the basis of the received device data. After that, the control unit 40 proceeds to S13.

Figure 7A:
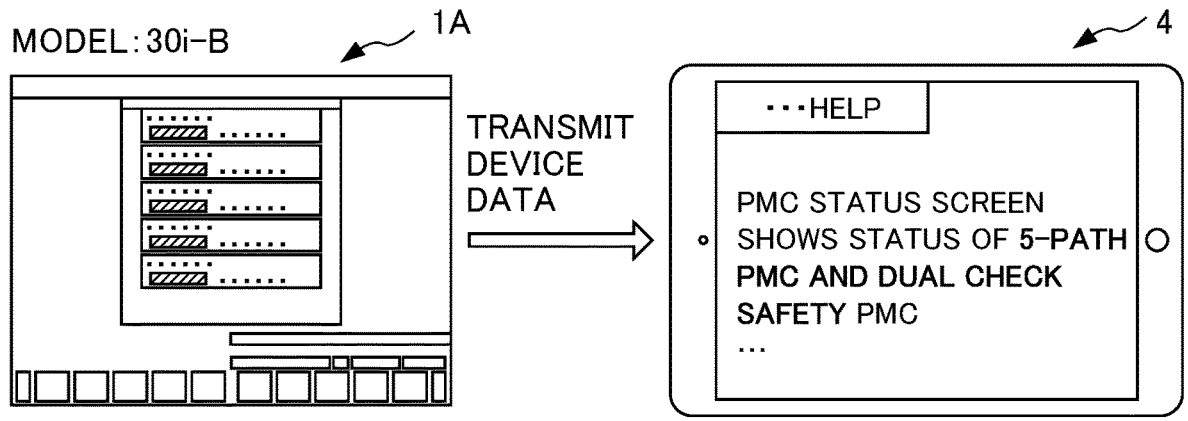
FIG. 7A is a diagram illustrating an example of a screen displayed on the external terminal after pairing is achieved according to the present embodiment.
Figure 7B:
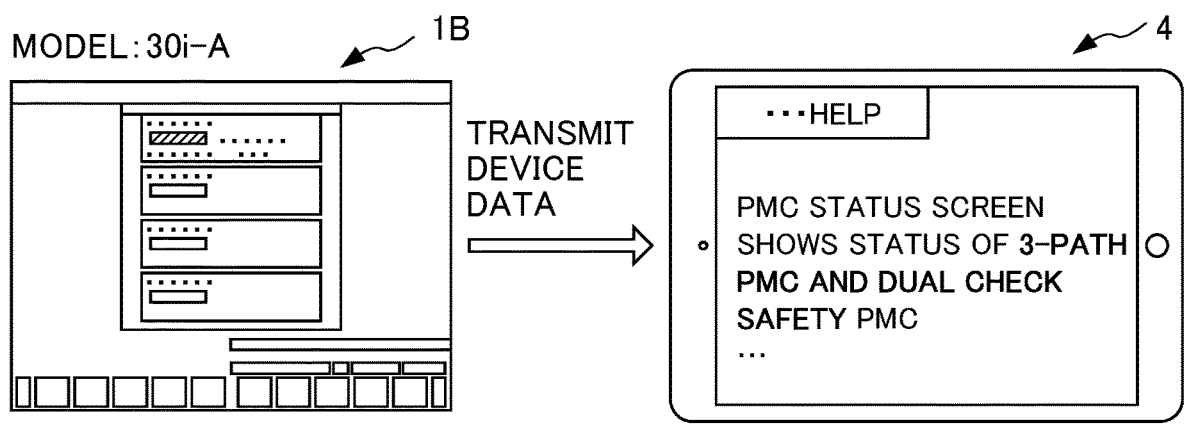
FIG. 7B is a diagram illustrating an example of a screen displayed on the external terminal after pairing is achieved according to the present embodiment.
Figure 7C:
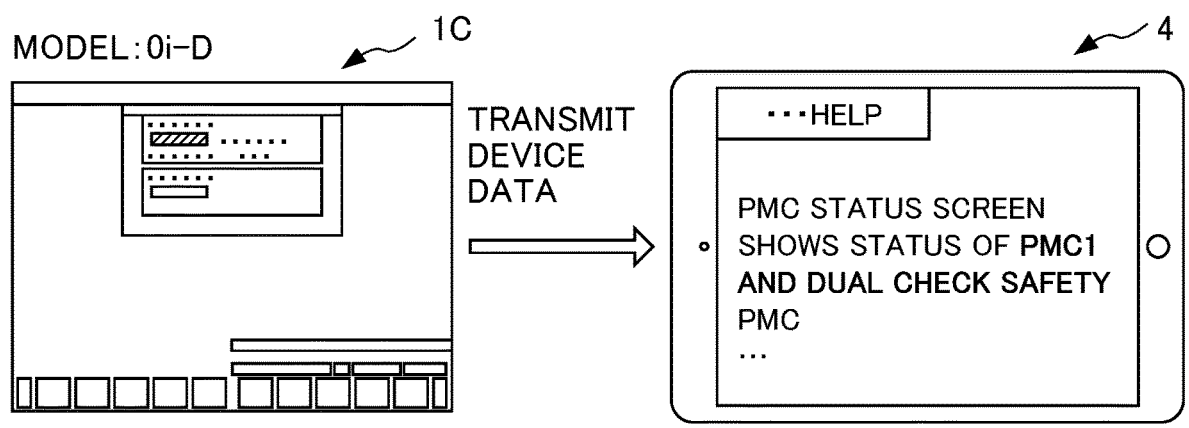
FIG. 7C is a diagram illustrating an example of a screen displayed on the external terminal after pairing is achieved according to the present embodiment.

Here, the screen displayed on the touch panel 48 on the basis of the connection destination numerical controller 1 will be described by way of the examples illustrated in FIGS. 7A to 7C. FIG. 7A illustrates an example of the display screen of the external terminal 4 having received the device data of the numerical controller 1A, FIG. 7B illustrates an example of the display screen of the external terminal 4 having received the device data of the numerical controller 1B, and FIG. 7C illustrates an example of the display screen of the external terminal 4 having received the device data of the numerical controller 1C. As in this example, the numerical controllers 1A to 1C have different pieces of model information, the external terminal 4 displays description information corresponding to the types of the numerical controllers 1A to 1C. Therefore, an operator does not need to examine the type of the connected numerical controller 1.

In S13 of FIG. 4, the control unit 40 determines whether the display data that the numerical controller 1 has transmitted in S22 of FIG. 5 has been received. When the display data was received (S13: YES), the control unit 40 proceeds to S14. On the other hand, when the display data was not received (S13: NO), the control unit 10 proceeds to S17. In S14, the control unit 40 (the description information output unit 41) performs a screen information displaying process. On the other hand, in S17, the control unit 40 determines whether pairing has terminated based on the fact that an operator has issued a pairing termination operation or that communication is disconnected due to certain reasons, for example. When pairing is terminated (S17: YES), the control unit 40 ends this process. On the other hand, when pairing remains active (S17: NO), the control unit 40 proceeds to S13.

Here, a screen information displaying process will be described. A screen information displaying process is a process of outputting a screen based on a priority level of a screen data ID included in display data to the touch panel 48. A priority level is assigned to a screen data ID indicating the information below, for example, and information (1) has the highest priority level and information (5) has the lowest priority level.

(1) Data pointed on touch panel 18
(2) Alarm information
(3) Information on abnormalities in input value
(4) Information on data under cursor
(5) Information on overall screen Priority data indicating a priority level is stored in the description information storage unit 46 in correlation with a screen data ID. The priority level is an example and is not limited thereto.

The control unit 40 specifies a screen data ID having the highest priority level among all screen data IDs included in the display data by referring to the description information storage unit 46. The control unit 40 (the description information output unit 41) acquires description information corresponding to the specified screen data ID from the description information storage unit 46 and outputs the description information to the touch panel 48.

Hereinafter, screen display based on the priority level of a screen data ID will be described based on examples.

Specific Example 1

FIG. 8 illustrates an example in which a ladder diagram screen 30 is displayed on the touch panel 18 of the numerical controller 1. In this case, the screen data ID included in the display data transmitted by the numerical controller 1 does not include a screen data ID having a high priority level. Therefore, a general help content of the ladder diagram screen 30 is displayed on the touch panel 48 of the external terminal 4 as overall screen information 60.

Next, a case in which an operator has operated a pointer 30a and has selected a character string 30b in a state in which the ladder diagram screen 30 is displayed will be described. Upon receiving the selection of the character string 30b, the numerical controller 1 transmits display data including a screen data ID related to "data pointed on the touch panel 18" having the priority level (1) to the external terminal 4. Specifically, the screen data ID includes the data ID of the character string 30b. As a result, description information corresponding to the character string 30b is displayed on the touch panel 48 of the external terminal 4 as information 61 on pointed data.

Specific Example 2

FIG. 9 illustrates an example in which an alarm screen 32 is displayed on the touch panel 18 of the numerical controller 1. In this case, since an alarm is not displayed on the alarm screen 32, the screen data ID included in the display data transmitted by the numerical controller 1 does not include a screen data ID having a high priority level. Therefore, a general help content of the alarm screen 32 is displayed on the touch panel 48 of the external terminal 4 as overall screen information 62.

Subsequently, when an abnormality occurs in the numerical controller 1, an alarm message 32*a* is displayed on the alarm screen 32. In this case, the numerical controller 1 transmits display data including a screen data ID on "alarm information" having the priority level (2) to the external terminal 4. Specifically, the screen data ID includes data ID of the alarm message 32*a*. As a result, information 63 on the description of the alarm message 32*a* is displayed on the touch panel 48 of the external terminal 4.

[Output of Appropriate Description Information]

Here, for example, when an alarm message is output by the numerical controller 1, it is necessary to change the description information to be output depending on the type of the numerical controller 1. For example, even when numerical controllers have the same model information, if the numerical controllers have different pieces of option information, the numerical controllers 1 have different types, and it may be necessary to add another description information to the description information or remove some description information before the description information is output. Editing of description information depending on option information will be described below.

FIG. 10 is a flowchart illustrating an option process indicating a process of adding or removing description information depending on option information. In S30, the control unit 40 determines whether the cause of an alarm is related to option information of the numerical controller 1. The description information storage unit 46 stores option data in correlation with description information, and the control unit 40 can determine whether the cause of an alarm is related to option information by referring to the description information storage unit 46, for example. When the cause of an alarm is related to option information (S30: YES), the control unit 40 proceeds to S31. On the other hand, when the cause of an alarm is not related to option information (S30: NO), the control unit 40 proceeds to S34. In S31, the control unit 40 determines whether description information on addition or removal corresponding to option information is present. The control unit 40 can determine whether the description information on addition or removal corresponding to the option information is present by referring to the description information storage unit 46, for example. When the description information on addition or removal corresponding to the option information is present (S31: YES), the control unit 40 proceeds to S32. On the other hand, when the description information on addition or removal corresponding to the option information is not present (S31: NO), the control unit 40 proceeds to S34.

In S32, the control unit 40 (the description information output unit 41) performs a process of adding description information on the cause of an alarm occurring when option information is present to original description information by referring to the description information storage unit 46. In S33, the control unit 40 (the description information output unit 41) performs a process of removing description information on the cause of an alarm that does not occur when option information is present from the original description information by referring to the description information storage unit 46. In S34, the control unit 40 (the description information output unit 41) outputs the description information to the touch panel 48. After that, the control unit 40 ends this process.

Figure 11A:
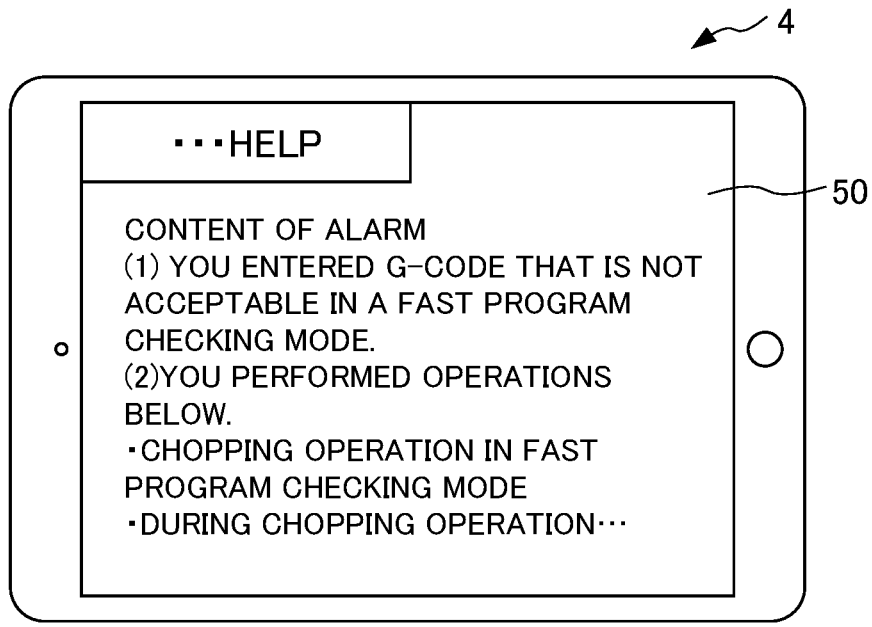
FIG. 11A is a diagram illustrating a specific example of the display on the external terminal corresponding to the option information of the numerical controller according to the present embodiment.
Figure 11B:
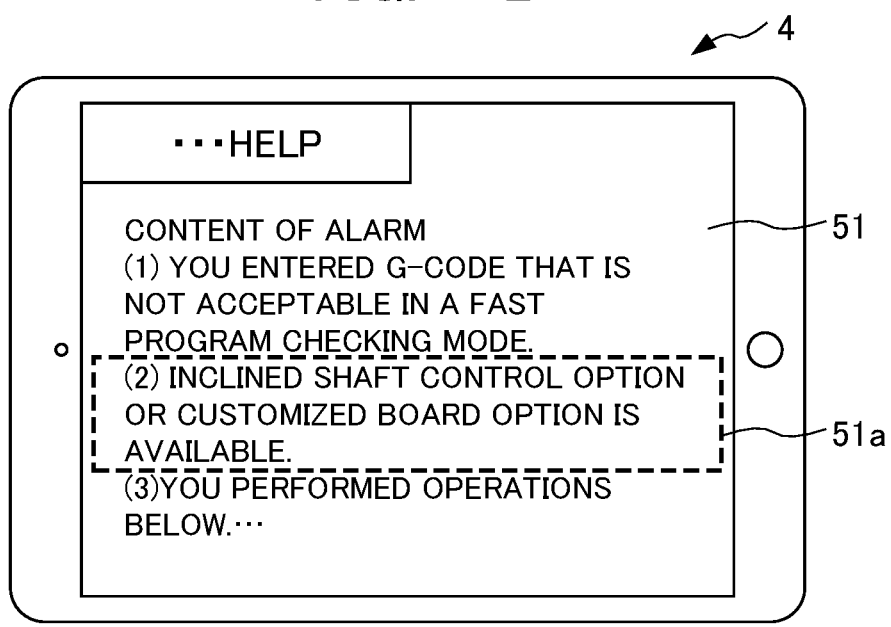
FIG. 11B is a diagram illustrating a specific example of the display on the external terminal corresponding to the option information of the numerical controller according to the present embodiment.

FIGS. 11A and 11B illustrate an example when the process corresponding to S32 of FIG. 10 is performed. FIG. 11A illustrates an example in which description information on addition or removal corresponding to the option information is not present, and FIG. 11B illustrates an example in which description information on addition corresponding to the option information is present. A description screen 50 illustrated in FIG. 11A and a description screen 51 illustrated in FIG. 11B are description information of the same alarm content. However, on the description screen 51 of FIG. 11B, description information 51*a* on the cause of an alarm occurring when the option information is present is added. That is, the numerical controller 1 corresponding to the output of the description screen 51 of FIG. 11B has at least one piece of option information of an inclined shaft control option and a customized board option. Therefore, the external terminal 4 outputs the description screen 51 in which the description information 51*a* on the option information is added.

Figure 12A:
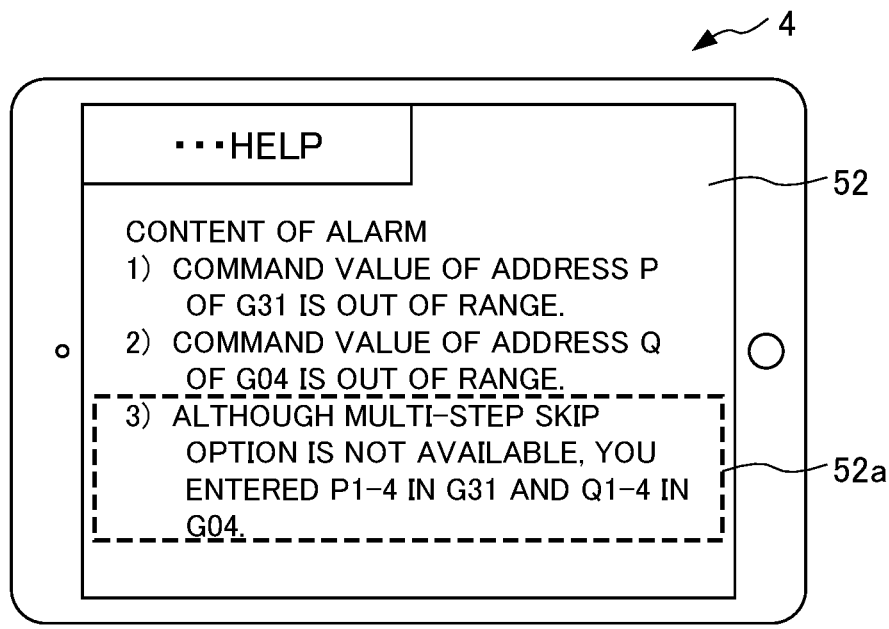
FIG. 12A is a diagram illustrating a specific example of the display on the external terminal corresponding to the option information of the numerical controller according to the present embodiment.
Figure 12B:
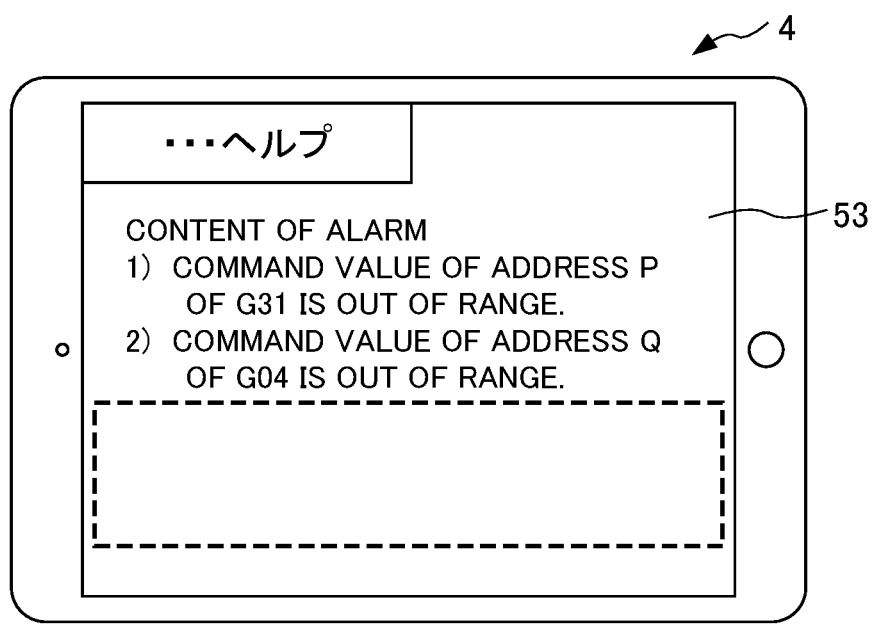
FIG. 12B is a diagram illustrating a specific example of the display on the external terminal corresponding to the option information of the numerical controller according to the present embodiment.

FIGS. 12A and 12B illustrate an example when the process corresponding to S33 of FIG. 10 is performed. FIG. 12A illustrates an example when description information on addition or removal corresponding to option information is not present, and FIG. 12B illustrates an example when description information on removal corresponding to option information is present. A description screen 52 illustrated in FIG. 12A and a description screen 53 illustrated in FIG. 12B are description information of the same alarm content. However, on the description screen 53 of FIG. 12B, description information 52*a* on the cause of an alarm that does not occur when the option information is present is removed. That is, the numerical controller 1 corresponding to the output of the description screen 53 has option information on a multi-step skip function. Therefore, the external terminal 4 outputs a description screen 53 in which the description information 52*a* related to the corresponding option information is removed.

Specific Example 3

FIG. 13 illustrates an example in which a configuration parameter screen 34 is displayed on the touch panel 18 of the numerical controller 1. A cursor is positioned in an input region 34*a* of the configuration parameter screen 34. In this case, the numerical controller 1 transmits display data including a screen data ID on "information on data under a cursor" having the priority level (4) to the external terminal 4. Specifically, the screen data ID includes a data ID of data input in the input region 34*a*. Therefore, information 64 on the description of the input region 34*a* is displayed on the touch panel 48 of the external terminal 4.

Subsequently, when an operator inputs an abnormal value in the input region 34*a*, an input region 34*a* in which a value indicating an abnormality is input and an input region 34*b* in which the same value is input are displayed on the configuration parameter screen 34 in a highlighted manner. Moreover, the content of an abnormality is displayed as an alarm message 34*c*. In this case, the numerical controller 1 transmits display data including a screen data ID on "information on abnormalities in input value" having the priority level (3) to the external terminal 4. Specifically, the screen data ID includes a data ID of data input to the input regions 34*a* and 34*b*. As a result, description information 65 on abnormalities in the input regions 34*a* and 34*b* is displayed on the touch panel 48 of the external terminal 4.

Specific Example 4

FIG. 14 illustrates an example in which a parameter menu screen 36 is displayed on the touch panel 18 of the numerical controller 1. A cursor is placed on a first item 36a. In this case, the numerical controller 1 transmits display data including a screen data ID on "information on data under cursor" having the priority level (4) to the external terminal 4. Specifically, the screen data ID includes a data ID of data indicated by the item 36a under the cursor. Therefore, description information 66 on the setting of "CNC-PNC interface" indicated by the item 36a is displayed on the touch panel 48 of the external terminal 4.

Subsequently, when an operator moves a cursor over a second item 36b, the numerical controller 1 transmits display data including a screen data ID on "information on data under cursor" having the priority level (4) to the external terminal 4. Specifically, the screen data ID includes a data ID of data indicated by an item 36b under the cursor. Therefore, description information 67 related to the setting of "machine signal interface" indicated by the item 36b is displayed on the touch panel 48 of the external terminal 4.

[Continuation of Connecting Process]

The description of the specific example of S14 in FIG. 4 ends, and the flowchart of the connecting process will be described. In S15 of FIG. 4, the control unit 40 (the transition destination information output unit 42) determines whether another description information corresponding to transition destination information has been displayed upon receiving a selecting operation on the transition destination information. For example, when an operator performs an operation of selecting a hyperlink included in the displayed description information, the control unit 40 (the transition destination information output unit 42) displays detailed information on the information indicated by the hyperlink as the other description information, for example. When the other description information corresponding to the transition destination information is displayed (S15: YES), the control unit 40 proceeds to S16. On the other hand, when the other description information corresponding to the transition destination information is not displayed (S15: NO), the control unit 40 proceeds to S13. In S16, the control unit 40 (the transition data transmitting unit 43) transmits transition data including a description ID for identifying the other description information to the numerical controller 1. After that, the control unit 40 proceeds to S13.

In S23 of FIG. 5, the control unit 10 determines whether the transition data has been received. When the transition data is received (S23: YES), the control unit 10 proceeds to S24. On the other hand, when the transition data is not received (S23: NO), the control unit 10 proceeds to S25. In S24, the control unit 10 (the screen switching output unit 13) switches a display content from the screen displayed on the touch panel 18 to a screen corresponding to the transition data transmitted from the external terminal 4. Specifically, the control unit 10 outputs a screen corresponding to a description ID included in the transition data to the touch panel 18 by referring to the description corresponding screen storage unit 17.

In S25, the control unit 10 determines whether the screen information displayed on the touch panel 18 has changed. The screen information displayed on the touch panel 18 changes when an operator performs a switching operation so as to change a screen to be displayed or the screen to be displayed is changed on the basis of the processing of the numerical controller 1. When the screen information is changed (S25: YES), the control unit 10 proceeds to S22 to transmit display data including screen data IDs of all pieces of data on the screen after the change to the external terminal 4. On the other hand, when the screen information is not changed (S25: NO), the control unit 10 proceeds to S23.

Specific Example 5

Here, a specific example when YES is selected in S15 of FIG. 4 will be described. YES is selected in S15 of FIG. 4 when a selecting operation on the transition destination information on the screen of the description information displayed on the external terminal 4 is received and the external terminal 4 displays the other description information corresponding to the transition destination information. A screen in the top left part of FIG. 15 illustrates a ladder diagram screen 38 displayed on the touch panel 18 of the numerical controller 1. A character string 38a is selected. In this case, the numerical controller 1 transmits display data including a screen data ID on "data pointed on the touch panel 18" having the priority level (1) to the external terminal 4. Specifically, the screen data ID includes a data ID of the character string 38a. As a result, description information corresponding to the character string 38a is displayed on the touch panel 48 of the external terminal 4 as information 68 on the data being pointed (see the top right part of the drawing).

The information 68 includes a hyperlink 68a on a character string "(R9000, Z0)". When an operator touches on the hyperlink 68a of the touch panel 48, the external terminal 4 outputs information 69 on the touch panel 48 (see the bottom right part of the drawing). The information 69 is detailed information of the information indicated by the hyperlink 68a. Specifically, the information 69 is description information of "(R9000, Z0)". The external terminal 4 transmits transition data including a description ID indicating the information 69 to the numerical controller 1. Specifically, the description ID indicates "(R9000, Z0)". The numerical controller 1 receives transition data including the description ID indicating the information 69. The numerical controller 1 extracts a signal status screen 39 as a screen corresponding to the description ID indicating the information 69 by referring to the description corresponding screen storage unit 17. As a result, the signal status screen 39 indicating the information on an address R9000 displayed by the information 69 is displayed on the touch panel 18 (see the bottom left part of the drawing).

In this way, in the display system 100, the numerical controller 1 is connected to the external terminal 4 by pairing regardless of the type of the numerical controller 1, and the screen information of the numerical controller 1 is output to the external terminal 4. Therefore, information appropriate for the numerical controller 1 can be displayed on the external terminal 4. Specifically, the display data including screen data IDs of all pieces of data output to the touch panel 18 of the numerical controller 1 is transmitted to the external terminal 4. The external terminal 4 can receive the screen data IDs of all pieces of data from the numerical controller 1 and output the description information corresponding to the screen data IDs to the touch panel 48 of the external terminal 4 by referring to the description information storage unit 46.

The external terminal 4 outputs description information corresponding to a screen data ID having a high priority level among all screen data IDs to the touch panel 48. Therefore, an operator can see description information having a high priority level and useful for the operator.

The screen data ID includes a screen ID displayed on the touch panel 18, data IDs of respective pieces of data forming the display screen, a data ID of data selected by an operation, a data ID of data indicating an abnormality in an input value, and the like. Therefore, it is possible to output description information on the basis of the screen data IDs of various pieces of data of the display screen.

The numerical controller 1 transmits device data indicating the type of the numerical controller, including model information of the numerical controller 1 and option information and parameters related to additional elements to the external terminal 4. The external terminal 4 performs editing to add or remove the acquired description information on the basis of the received device data and then outputs the edited description information to the touch panel 48. Therefore, it is possible to output only the description information corresponding to the type of the numerical controller 1 efficiently.

When transition destination information is present in the description information output to the touch panel 48 of the external terminal 4, if the transition destination information is selected and the other description information is switched and output to the touch panel 48, the touch panel 18 of the numerical controller 1 also outputs information related to the switched other description information. Therefore, the external terminal 4 can cooperate with the numerical controller 1 and the usability can be improved.

The programs used in the present invention can be stored on any of various types of non-transitory computer readable media and be provided to a computer. The non-transitory computer readable media include various types of tangible storage media. Examples of the non-transitory computer readable media include a magnetic recording medium (for example a flexible disk, a magnetic tape, and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). The programs may be supplied to a computer via various types of transitory computer readable media. Examples of transitory computer readable media include electrical signals, optical signals, and electromagnetic waves. The transitory computer readable media can supply programs to a computer via a cable communication path such as electric wires and an optical fiber or a wireless communication path.

The above-described embodiment is a preferred embodiment of the present invention. However, the scope of the present invention is not limited to the embodiment only but the present invention can be embodied in various modifications without departing from the spirit of the present invention.

Modification 1

Although the embodiment has been described that description information with a high priority level is output, there is no limitation thereto. For example, pieces of description information corresponding to all screen data IDs may be output in descending order of priority levels. In this case, an operator may scroll down the touch panel 48 or transition the screen to the next page, for example, and the external terminal 4 may display the pieces of description information sequentially on the touch panel 48.

Modification 2

Although the embodiment has been described that Bluetooth is used as a pairing technology, there is no limitation thereto. Pairing may be achieved using Wi-Fi and other communication schemes may be used.

Modification 3

Although the embodiment has been described that the touch panel 18 is used as the display device of the numerical controller 1, there is no limitation thereto. A display device such as a display and an input device for inputting keys may be configured as separate devices.

Modification 4

Although the present embodiment has been described by way of an example of the numerical controller 1, there is no limitation thereto. The numerical controller may be a controller that performs control on an industrial machine including at least a machine tool or a robot and may be a robot controller or the like.

EXPLANATION OF REFERENCE NUMERALS

1, 1A to 1C: Numerical controller
4: External terminal
10, 40: Control unit
11: Device data transmitting unit
12: Display data transmitting unit
13: Screen switching output unit
15, 45: Storage unit
16: ID storage unit
17: Description corresponding screen storage unit
18, 48: Touch panel
41: Description information output unit
42: Transition destination information output unit
43: Transition data transmitting unit
46: Description information storage unit
100: Display system

What is claimed is:

1. A display system comprising:
a controller that has a display device and performs control on an industrial machine including at least a machine tool or a robot; and
an external terminal, wherein
the controller includes a first central processing unit that is configured to transmit display data including data identification information of all pieces of data displayed on the display device to the external terminal, and
the external terminal includes:
a description information storage unit that stores the data identification information and description information corresponding to the data identification information in correlation; and
a second central processing unit that is configured to acquire, from the description information storage unit, the description information based on the data identification information included in the display data received from the controller and output the description information to a display unit.

2. The display system according to claim 1, wherein
the description information storage unit of the external terminal further stores a priority level of the description information in correlation with the description information, and
the second central processing unit of the external terminal is configured to acquire, from the description information storage unit, the description information having a highest priority level among pieces of description information based on the display data received from the controller and output the description information to the display unit.

3. The display system according to claim 2, wherein the second central processing unit of the external terminal is configured to acquire, from the description information storage unit, the pieces of description information based on the data identification information included in the display data received from the controller in descending order of priority levels and output the description information to the display unit.

4. The display system according to claim 1, wherein the data identification information includes identification information of a screen displayed on the display device, identification information of each piece of data that forms the screen, identification information of data selected by an operation, and identification information of data indicating an abnormality in an input value.

5. The display system according to claim 1, wherein the first central processing unit of the controller is configured to transmit, to the external terminal, device data indicating a type of the controller including model information of the controller and option information and parameters related to additional elements, the description information storage unit of the external terminal further stores the device data in correlation with the description information, and the second central processing unit of the external terminal is configured to perform editing to add or remove the acquired description information on the basis of the device data by referring to the description information storage unit and output the edited description information to the display unit.

6. The display system according to claim 1, wherein the description information includes transition destination information for transitioning the description information to another description information, the second central processing unit of the external terminal is further configured to:
  output the other description information corresponding to the transition destination information to the display unit upon receiving an operation of selecting the transition destination information of the description information output to the display unit; and
  transmit transition data including description identification information for identifying the other description information to the controller, the controller further includes a description corresponding screen storage unit that stores the description identification information and a screen corresponding to a description content of the description identification information, and the first central processing unit of the controller is configured to acquire a screen corresponding to the description identification information of the received transition data from the description corresponding screen storage unit and output the screen to the display device.

* * * * *